United States Patent [19]
Chu et al.

[11] Patent Number: 5,585,081
[45] Date of Patent: Dec. 17, 1996

[54] $SO_x$, $NO_x$ AND PARTICULATE REMOVAL SYSTEM

[75] Inventors: Paul Chu, Canton; William Downs, Alliance, both of Ohio; John B. Doyle, Littleton, Colo.; Peter V. Smith, North Canton, Ohio

[73] Assignee: The Babcock & Wilcox Company, New Orleans, La.

[21] Appl. No.: 504,192

[22] Filed: Apr. 3, 1990

Related U.S. Application Data

[60] Division of Ser. No. 404,153, Sep. 7, 1989, abandoned, which is a continuation-in-part of Ser. No. 224,419, Jul. 25, 1988, Pat. No. 4,871,522.

[51] Int. Cl.⁶ .................. B01D 53/34; B01J 8/00
[52] U.S. Cl. ............ 423/239.1; 423/235; 423/244.05; 423/244.07; 422/171; 422/177; 422/222; 422/180; 422/312
[58] Field of Search ............... 422/177, 171, 422/197, 312, 222, 223, 180; 423/239 A, 239, 244 A, 244 R, 244.05, 244.07, 239.1, 235; 55/302

[56] References Cited

U.S. PATENT DOCUMENTS

| | | | |
|---|---|---|---|
| 1,814,597 | 7/1931 | Handforth | 422/222 |
| 3,857,680 | 12/1974 | Porta et al. | 422/222 |
| 4,282,115 | 8/1981 | Atsukawa et al. | 502/218 |
| 4,309,386 | 1/1982 | Pirsh | 422/177 |
| 4,578,092 | 3/1986 | Klimczak | 55/302 |
| 4,732,879 | 12/1988 | Kalinowski et al. | 502/5 |
| 4,793,981 | 12/1988 | Doyle et al. | 423/239 |
| 4,861,353 | 8/1989 | Wyss | 55/302 |
| 4,871,522 | 10/1989 | Doyle | 423/244 |
| 4,874,586 | 10/1989 | Szymanski et al. | 422/177 |

FOREIGN PATENT DOCUMENTS

| 0217733 | 8/1986 | European Pat. Off. ........ B01D 53/36 |
|---|---|---|

OTHER PUBLICATIONS

"Ceramic Fabrics for Filtration at High Temperatures, 550–1600 F", L. R. White, R. J. Forester, D. L. O'Brien & G. A. Schmitt, 3M Co. 1986.
"VKR Full–Scale SCR Experience on Hardcoal Fired Boilers", Klaus Goldschmidt, VEBA Kraftwerke Ruhr AG.
"A Hot and Dirty Future for Baghouses", *Chemical Engineering*, Apr., 1989, pp. 30–35.
"Phase II Research Proposal for NOX–SOX–ROX Box Research Proposal Project (B & W Proposal No. R & D 87–083)", submitted to Ohio Department of Development, Sep. 1, 1987.
Promotional brochure—first distributed at the Pittsburgh Coal Conference, Sep. 12–16, 1988.
Kitto, Jr., J. B., *Modern Power Systems*, Jan., 1989.
Chu, P., Downs, W., and Holmes, A. R., "Sorbent and Ammonia Injection at Economizer Temperatures Upstream of a High–Temp. Bag", AIChe Meeting Apr. 2–6, 1989.

*Primary Examiner*—Long V. Le
*Attorney, Agent, or Firm*—Daniel S. Kalka; Robert J. Edwards

[57] ABSTRACT

A method for controlling emissions of a fossil fuel fired boiler including a high temperature fabric filter house with an SCR catalyst situated therein for receiving flue gases along with an injected ammoniacal compound and sorbent. The sorbent reacts with the $SO_x$ while the ammoniacal compound reduces the $NO_x$ in the presence of the SCR catalyst inside the high temperature fabric filter house. Both the $SO_x$ and the particulates are removed upstream of the SCR catalyst to diminish the problems of $SO_2$ or $SO_3$ poisoning of the catalyst and erosion and fouling of the catalyst with the fly ash. Since the sulfur oxides and particulates are removed prior to the heat recovery system, the fouling and corrosion potential are substantially decreased thus allowing the heat recovery system to be operated at a lower outlet flue gas temperature which yields an incremental improvement in energy recovery.

10 Claims, 6 Drawing Sheets

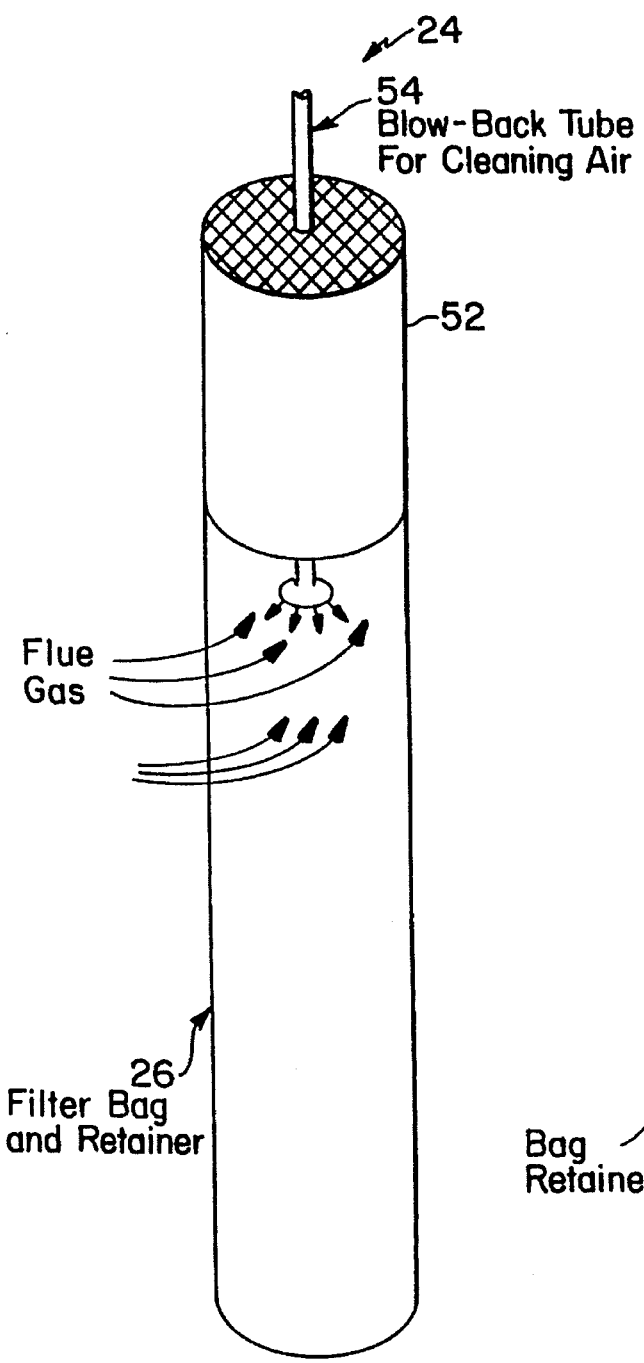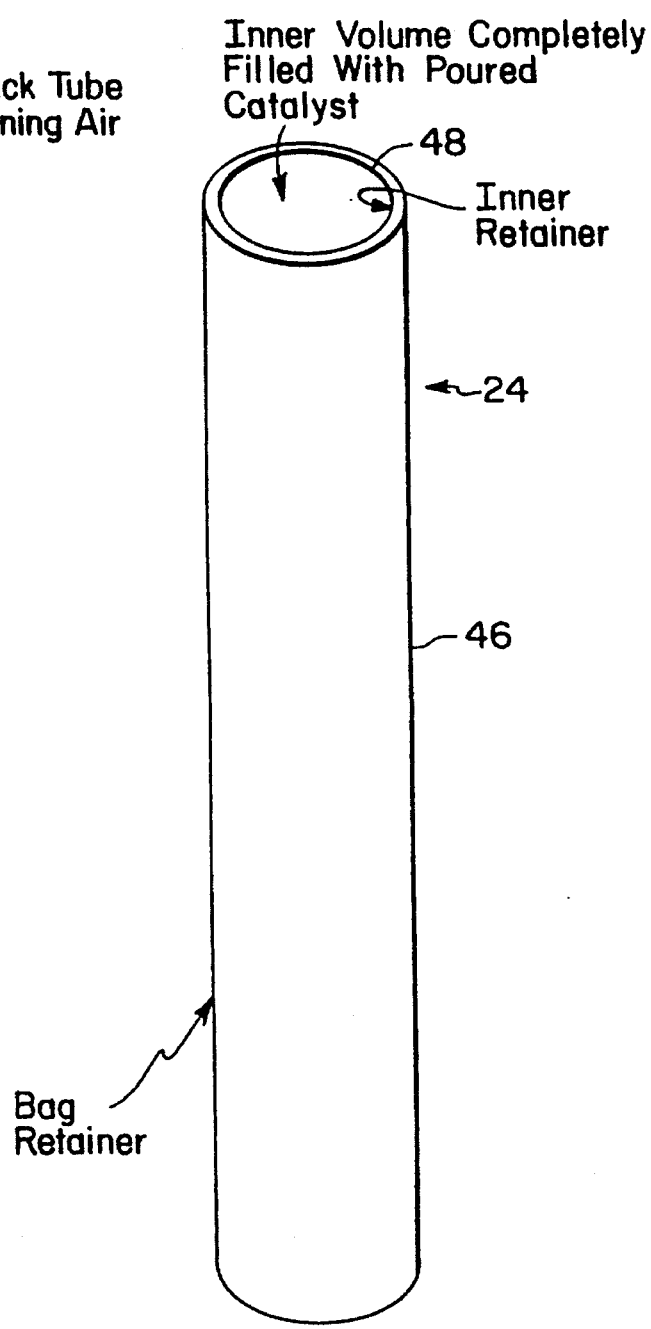

$SO_x$, $NO_x$ AND PARTICULATE REMOVAL SYSTEM

This is a division of application Ser. No. 07/404,153 filed Sep. 7, 1989 now abandoned, which is a continuation-in-part of application Ser. No. 07/224,419, filed Jul. 25, 1988 and now U.S. Pat. No. 4,871,522 issued Oct. 3, 1989.

BACKGROUND OF THE INVENTION

1. Field of the Invention

The present invention relates in general to emission control equipment for fossil fuel fired power plants, and in particular, to a new and useful method and apparatus for $SO_x$, $NO_x$, and particulate control.

2. Description of the Related Art

Current energy policy in the United States is based on expanded use of coal in utility and industrial applications. This must not compromise environmental requirements however. Advanced control technologies are needed to control the increase in pollutant emissions of coal combustion. These pollutants include particulates, sulfur oxides ($SO_x$), and oxides of nitrogen ($NO_x$).

Fly ash and other particulate material can effectively be controlled using baghouses or fabric filterhouses. U.S. Pat. No. 4,309,386 which is assigned to the assignee of the present invention, discloses a hot catalytic baghouse which simultaneously removes particulate material and reduces the $NO_x$ emissions. This patent describes coating the catalyst onto the fabric of the baghouse filter media including the use of a fabric filter in which the catalyst is woven into the fabric.

U.S. Pat. No. 4,793,981 also assigned to the assignee of the present application describes the use of a hot catalytic baghouse which simultaneously collects sulfur oxides, nitrogen oxides and particulates.

Selective catalytic reduction (SCR) of $NO_x$ by ammonia is a well-established art. Various catalyst types and shapes are utilized in stand-alone reactors, whereby flue gas is mixed with small quantities of ammonia and then contacted with the catalyst. Also, sorbent or alkali injection into the boiler and the ducts is a common approach for sulfur dioxide ($SO_2$) control from flue gas. The location of the sorbent injection may vary depending upon the type of sorbent.

U.S. Pat. No. 4,602,673 discloses an apparatus for preheating combustion air while simultaneously reducing $NO_x$ contained in the flue gas. By combining a catalytic reactor with an air heater, a compact device is possible according to that patent. However, the catalyst will have to be replaced frequently because of erosion of the catalyst due to dust build-up. Another major problem not addresssed by this patent is poisoning of the catalyst from $SO_x$ in the flue gas. In addition, fly ash erosion will reduce the effective life of a SCR catalyst.

A combination of a catalytic baghouse and a heat pipe air heater having catalyst coating on its heating surfaces is described in U.S. Pat. No. 4,871,522, granted Oct. 3, 1979 which is assigned to the assignee of the present application and is incorporated herein by reference.

A need remains for an apparatus and method for simultaneous $SO_x$, $NO_x$ and particulate control which integrates the catalyst inside the fabric filters of the fabric filter house to protect the $NO_x$ reduction catalyst from fly ash erosion and poisoning by sulfur oxides or fly ash. There is also a need for an improved heat recovery system to allow for a lower outlet flue gas temperature to yield an incremental improvement in energy recovery. Further still a need remains for sorbent recycling and reactivation to improve the overall sorbent utilization while decreasing the feed sorbent requirements.

SUMMARY OF THE INVENTION

The present invention solves the aforementioned problems by providing a method and apparatus for controlling the emissions of three known pollutants that are generated when burning fossil fuels such as coal. The three pollutants are sulfur oxides ($SO_x$), nitrogen oxides ($NO_x$), and particulates.

In accordance with the invention, a high-temperature fabric filter house or baghouse is employed together with means for recovering heat from the waste gases generated from the combustion of fossil fuels. Advantageously, the SCR catalyst is integrated inside at least one fabric filter of the filter house, but preferably in all the filters. The SCR catalyst may be located in the plenum of the baghouse, but inside the fabric filters is preferred. An ammoniacal compound in the presence of the SCR catalyst selectively reduces $NO_x$ to nitrogen and water.

Since the catalyst location is downstream of the fabric filter, the flue gas is essentially free of particulates and the majority of the sulfur oxides so as to protect the $NO_x$ catalyst. Moreover, by virtue of the catalyst being in the high temperature fabric filter house, it is at a temperature which promotes optimum reactivity.

The high-temperature fabric filter house is positioned upstream of the means for recovering heat. The dirty flue gas plus the sorbent and ammonia are supplied to the high-temperature fabric filter house where these pollutants are removed.

The "clean" flue gases are then supplied to the means for recovering heat which includes a conventional gas/gas heat exchanger or a combination thereof including but not limited to heat pipes, rotating discs, and rotating basket or even a gas/water heat exchanger where heat is transferred to the combustion air, or any other desired location.

Accordingly, an aspect of the present invention is to provide an apparatus and method of integrating an SCR catalyst into the fabric filter house downstream of the particulate and sulfur oxides collection. Consequently the flue gas is free of particulates and the majority of the sulfur oxides have been removed before the flue gas contacts the catalyst, thus protecting the $NO_x$ reduction catalyst from fly ash erosion and poisoning by sulfur oxides or fly ash.

Another aspect of the present invention is to enhance the thermal efficiency of steam generating boilers by providing a means to protect the heat recovering means from acid deposition and corrosion. This advantage is achieved by quantitative removal of sulfuric acid and $SO_3$ in the hot baghouse which in turn reduces the sulfuric acid dew point to a value approaching the water vapor dew point or typically below 150° F. in coal fired boilers.

The various features of novelty characterized in the present invention are pointed out with particularity in the claims annexed to and forming a part of this disclosure. For a better understanding of the invention, the operating advantages gained by its use, reference is made to the accompanying drawings and descriptive matter in which a preferred embodiment of the present invention is illustrated.

BRIEF DESCRIPTION OF THE DRAWINGS

In the drawings:

FIG. 8 is another embodiment of a configuration of a SCR catalyst; and

FIG. 9 is still another embodiment of a SCR catalyst.

DESCRIPTION OF THE PREFERRED EMBODIMENT

Figure 1:
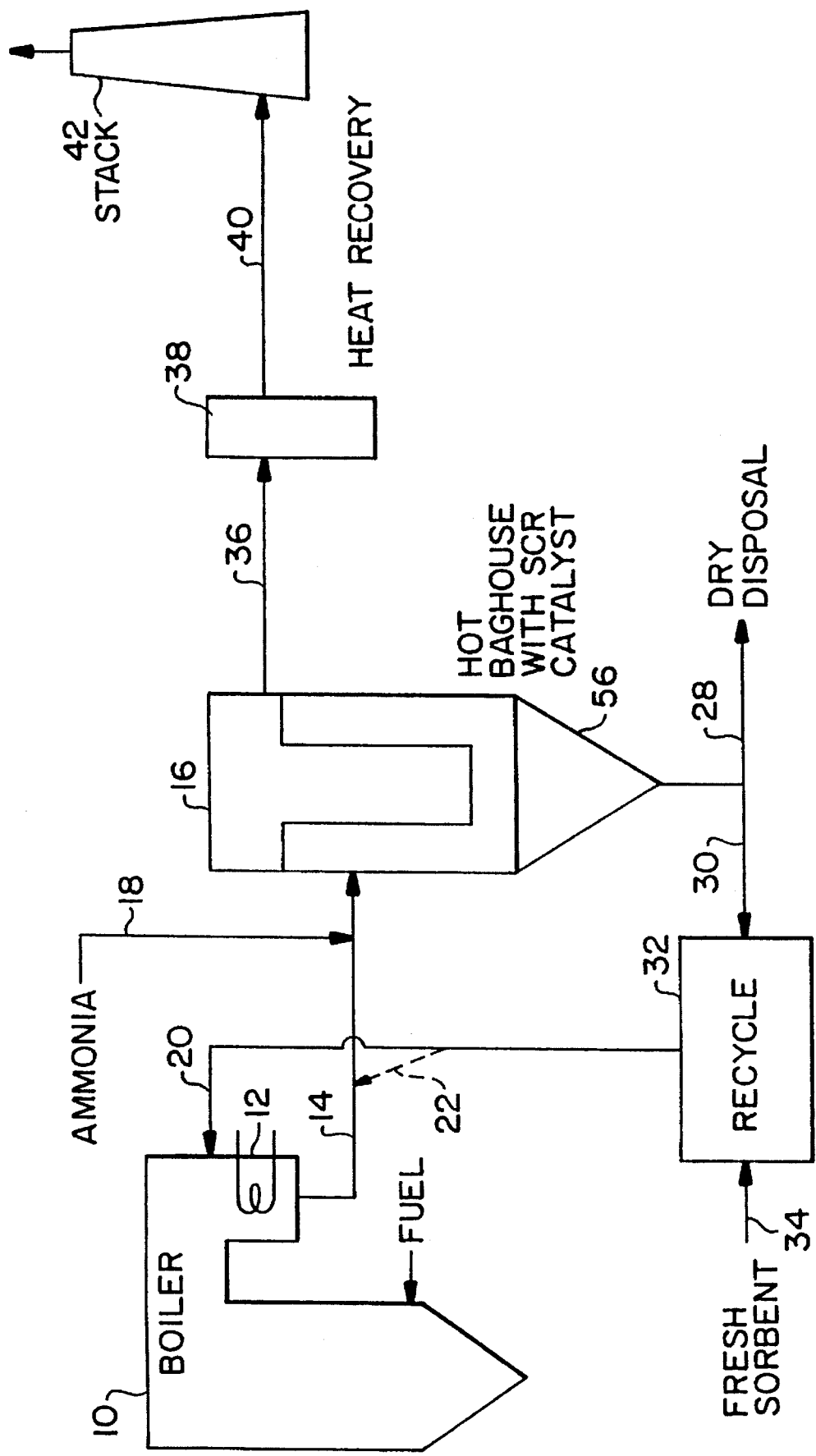
FIG. 1 is a schematic block diagram of an apparatus in accordance with the present invention for controlling emission of a fossil fuel fired boiler.

Referring to FIG. 1, the invention embodied therein comprises an apparatus for controlling the emissions of a fossil fuel fired boiler 10, and in particular a coal-fired boiler. Boiler 10 includes an economizer 12 which receives combustion flue gases therefrom. The flue gases are provided on a flue gas stream in an exhaust duct 14 connected to a fabric filter house or baghouse 16. Ammoniacal compounds are injected upstream of the high-temperature fabric filter house 16 at 18.

Ammoniacal compounds is a term meant to include compounds such as urea, ammonium sulfate, cyanuric acid, and organic amines as well as ammonia (NH$_3$). These compounds could be used as reducing agents in addition to ammonia. However, ammonia is preferred for economic reasons. Some non-ammoniacal counpounds such as carbon monoxide or methane can be used as well, but with some loss in effectiveness.

Sorbent is injected into the boiler, either upstream at 20 or downstream at 22 of the economizer 12. Depending upon the sorbent chosen, the sorbent is injected into the boiler, either upstream or downstream of the economizer. The term sorbent includes alkali both calcium-based or sodium-based including but not limited to calcium oxide, calcium hydroxide, calcium carbonate, calcium bicarbonate, calcium lignosulfonate, calcium silicate hydrates, sodium carbonate, sodium bicarbonate, soda ash, nahcolite, sodium aluminate, trona, sodium sesquicarbonate, and metal oxides of aluminum, copper, iron, and zinc.

For example, a calcium-based sorbent such as a mixture of hydrated lime and rehydrated recycled material are injected into the convective pass of a boiler upstream of the economizer 12 where the flue gas temperature may range from 600°–1400° F. (315°–760° C.). The optimum temperature will vary with each sorbent. Simultaneous dehydration and sulfation of the sorbent begins immediately upon injection and continues as the flue gases pass through the boiler 10, economizer 12, and duct 14 into the hig-temperature fabric filter house 16.

The fabric filter house 16 contains suitable fabric filters, such as woven ceramic fabric bags, for example, 3M Nextel™ ceramic-woven bags. These high-temperature fabric filters enable the operation of the filter house 16 in the temperature range of 500°–900° F. (260°–400° C.).

Figure 2:
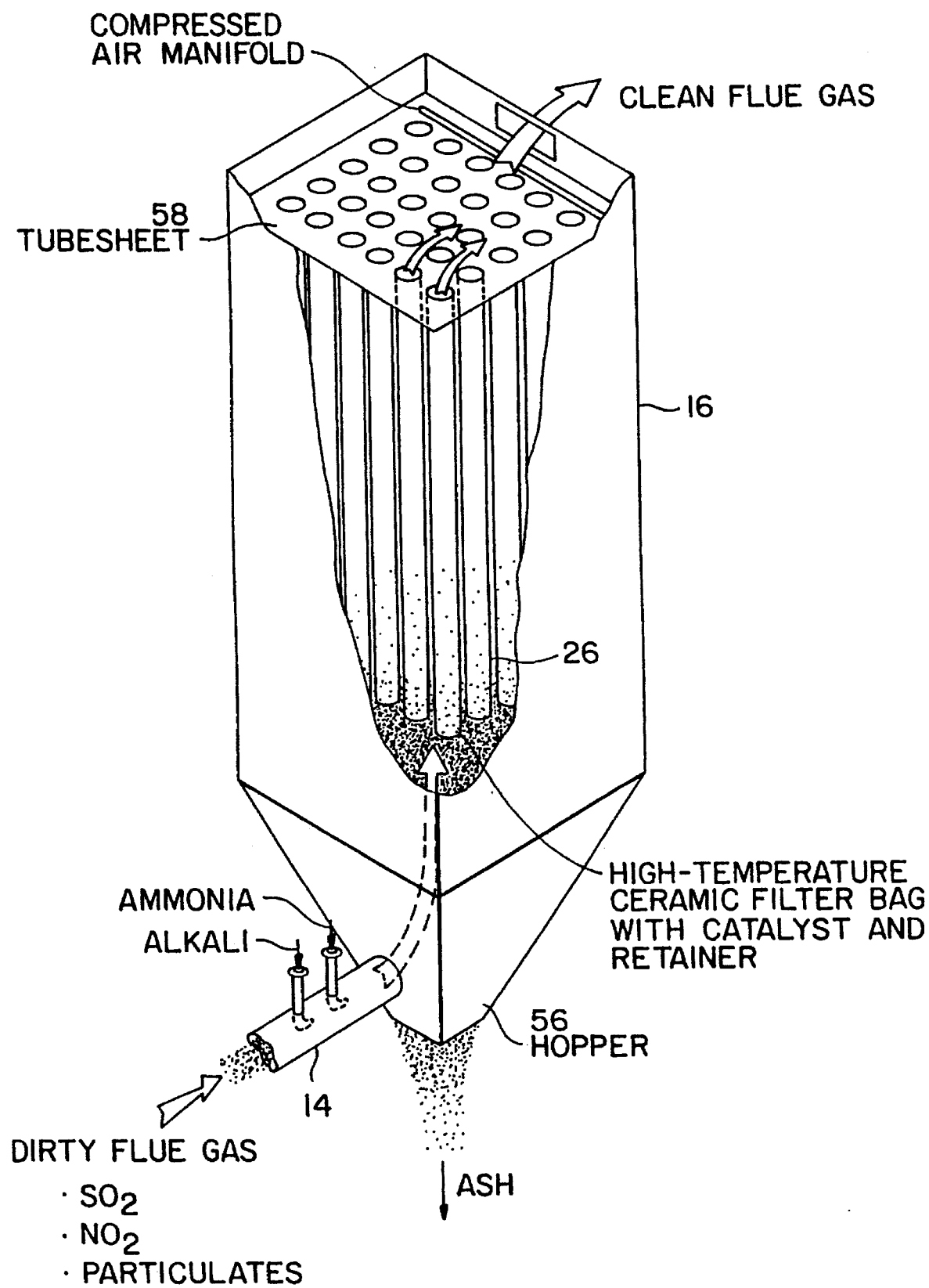
FIG. 2 is a cross-section in part of a high-temperature fabric filter house in accordance with the present invention.

The SCR catalyst 24 of which the composition is known in this art is incorporated into the filter house 16. As stated earlier, the SCR catalyst 24 may be located in the exhaust plenum of the baghouse 16, but preferably the SCR catalyst 24 is located inside the fabric filter 26 as is best seen in FIG. 2. The particulates and sorbent collects on the filter bags 26 to form filter cakes where additional reactions with the sulfur oxides occur. By the time the flue gas reaches the catalyst 24, the sulfur dioxide concentrations have been reduced by about 70–90%. The SO$_3$ concentrations have been reduced to below detectable levels, and the particulates have been reduced to trace levels (99.9+% efficiency).

To facilitate integration of the catalyst 24 into the fabric filter bag 26 of the fabric filter house 16, a baghouse with a pulse-jet cleaning system is utilized. In a pulse-jet baghouse 16, particulate filtration occurs on the outside of the bag 26, thus permitting incorporation of the catalyst 24 inside the bag 26 where in the presence of the SCR catalyst, such as a Zeolite catalyst, for example, the ammonia (NH$_3$) will selectively reduce NO$_x$ to nitrogen and water according to the following equation:

$$4NO + 4NH_3 + O_2 \rightarrow 4N_2 + 6H_2O \qquad (1)$$

In the above example, the catalyst is effective in the temperature range of 480°–970° F. (250°–520° C.). A catalyst temperature range of 700°–800° F. (370°–425° C.) is preferred at an NH$_3$:NO$_x$ stoichiometry of 0.9.

In the baghouse 16, the particulate formed during the combustion process and by the chemical reaction between the SO$_x$ and the sorbent are collected at the surface of the bag filter 26. The pulse-jet cleaning cycle of the baghouse 16 cleans the surface of the filters 26 and discharges the. particulates and sorbent into hoppers 56. The particulate or ash from the baghouse 16 can be discharged at 28 to dry disposal or supplied to the recycle unit 32 by line 30. Since the Solids collected in the baghouse 16 contain fly ash, sulfated sorbent, and unreacted sorbent, recycling of the sorbent provides additional opportunity for reaction with the sulfur oxides.

To obtain recycled reactive solids, the recycled material may require mechanical attrition and/or rehydration performed in a known fashion. The sulfated product layer is removed by mechanical means such as grinding, attrition, or pulverization. The rehydration is achieved at atmospheric or pressure conditions using a batch or continuous hydration technique.

The reactivated recycled solids are then injected into the flue gas for additional gas/solid contact time. These recycled solids may even be hydrated with the fresh sorbent by line 34, or in a separate process step. If hydrated separately, the sorbent particles in the recycle solids can vary in chemical composition from the fresh sorbent. The location for recycled solids injection can be in a different temperature zone from the fresh sorbent.

The now clean flue gas proceeds along the duct 36 to the means for recovering heat 38. Advantageously, the process of the present invention improves the heat recovery and boiler efficiency since SO$_2$, SO$_3$, and the particulates have been removed upstream of the means for recovering heat. The fouling and corrosion potential, i.e., acid dewpoint are substantially decreased. This depressed acid dewpoint allows operation of the heat recovery means 38 at a lower flue gas exit temperature thereby increasing heat recovery. Thus, the heat recovery system of the present invention is operated at a lower outlet flue gas temperature, yielding an incremental improvement in energy recovery. In the conventional system without SO$_2$, SO$_3$, and particulate control, the flue gas temperature is maintained about 250–300° F. in order to avoid the acid dewpoint. In the present invention, the exit gas temperature can be safely lowered to 175–200° F. (80°–95° C.) which represents an incremental energy recovery of about 1–3% of the total boiler heat load.

In the present invention, an additional heat transfer device recovers the additional available flue gas energy. In a conventional boiler system, the amount of energy removed in the air preheater is controlled by the flow rate and temperature of the primary and secondary combustion air. To recover this incremental amount of energy made available through the present invention, an additional heat transfer device may also be used. The additional device includes a combination of a conventional gas/gas heat exchanger such as a heat pipe, rotating disc, or rotating basket and a gas/water heat exchanger. With this improved heat recovery, the present invention increases rather than decreases the cycle efficiency of the boiler. The clean flue gas exits along duct 40 to the stack 42 where it passes into the environment.

The system of the present invention employs a combination of a high-temperature catalytic fabric filter house, an improved heat recovery system, and a recycle system for reactivating the unused sorbent to provide for lower capital costs for initial installation and operating costs thereafter. Furthermore, the present invention finds applicability to coal-fired units and reduces the problems due to $SO_2$ poisoning of the catalyst, catalytic oxidation of $SO_2$ to $SO_3$, and erosion and fouling of the catalyst by fly ash. The present invention provides a solution to these problems by placing the sulfur oxide and particulate removal systems upstream of the SCR catalyst while advantageously maintaining the temperature of the SCR catalyst 24 at its optimum reactivity.

Recently completed pilot-scale tests using a 3,000 ACFM high-temperature fabric filter house evaluated calcium-based sorbents and the viability of a $NO_x$ reduction catalyst in the system of the present invention. The results of these tests indicated that hydrated lime injection at economizer temperatures is feasible. The overall sulfur dioxide removal improved with increasing injection temperatures. Yet, $SO_2$ removals from about 70–90% were achieved at a $Ca(OH)_2:SO_2$ stoichiometry of 2. Tests further indicated that $NO_x$ removals greater than 80% were achieved at an $NH_3:NO_x$ stoichiometry of about 0.9.

The acid dewpoint of the flue gas at the baghouse outlet was less than 170° F., which was the lower detection limit of the acid dewpoint meter. Accordingly, the system of the present invention potentially operates at air preheater outlet temperatures much lower than conventional systems without sulfur dioxide control.

In these tests, high calcium, commercial-grade lime was employed as the sorbent. The three variables that most influenced $SO_2$ removal were the $Ca/SO_2$ stoichiometry, injection temperature, and bag cleanliness/filter cake thickness.

Figure 3:
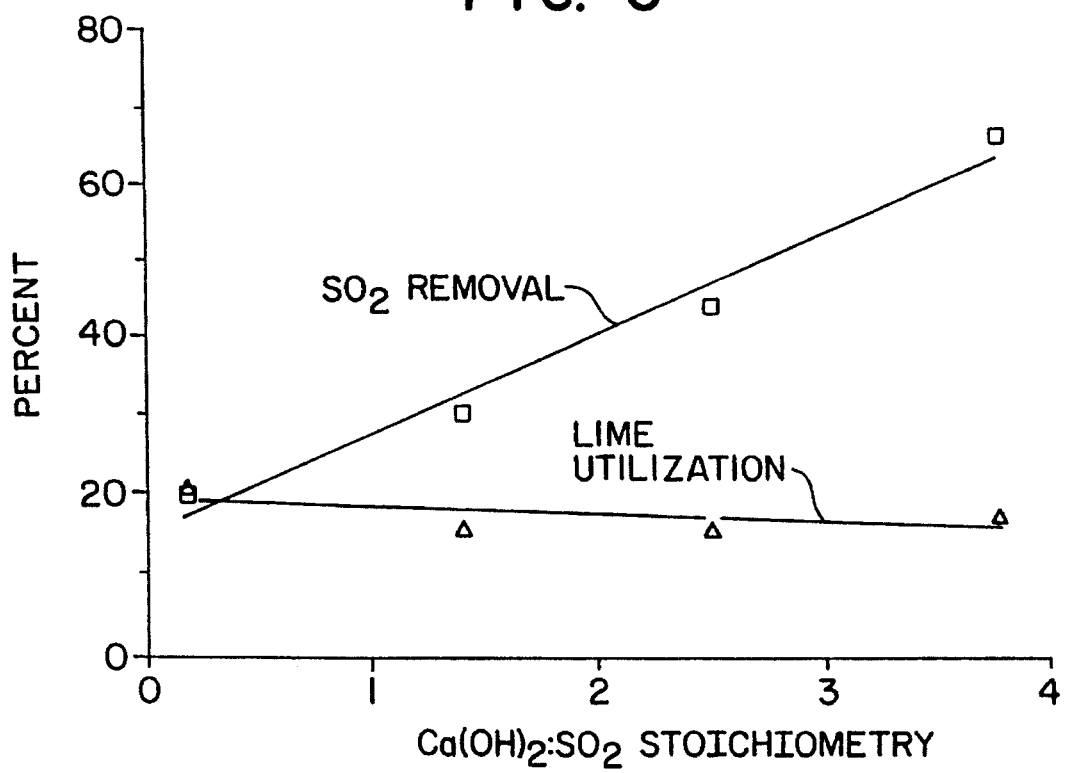
FIG. 3 is a plot of percent lime utilization versus CA(OH)$_2$:SO$_2$ stoichiometry.

FIG. 3 shows the influence of the $Ca/SO_2$ stoichiometry. Even though these tests were conducted at an injection temperature below the optimum temperature, FIG. 3 illustrates that the $SO_2$ removal performance can be normalized by stoichiometry over the range of stoichiometries tested (1 to 4). Sorbent utilization is equivalent to the $SO_2$ removal efficiency divided by the $Ca/SO_2$ stoichiometry.

Figure 4:
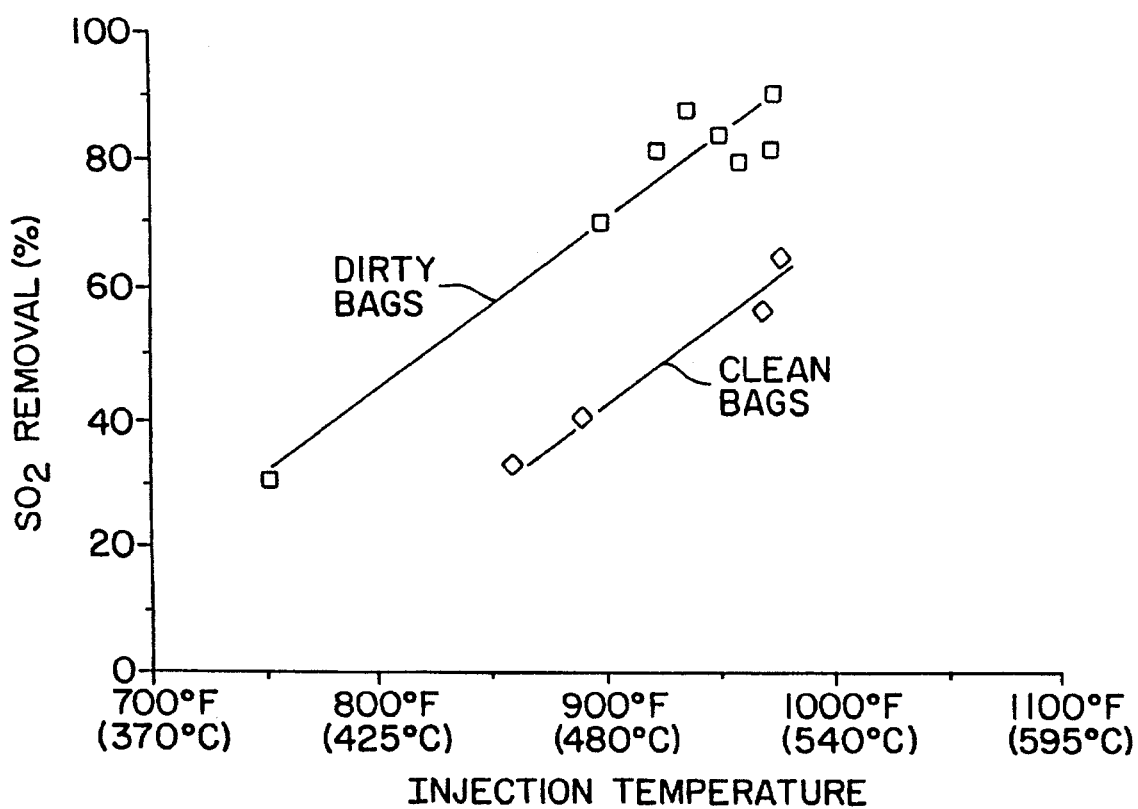
FIG. 4 is a graph of percent SO$_2$ removal versus injection temperature.

FIG. 4 depicts the effect of temperature at the point of injection upon $SO_2$ removal ranging from 720°–980° F. (380°–520° C.). $SO_2$ removal increased significantly as the temperature rose.

Figure 5:
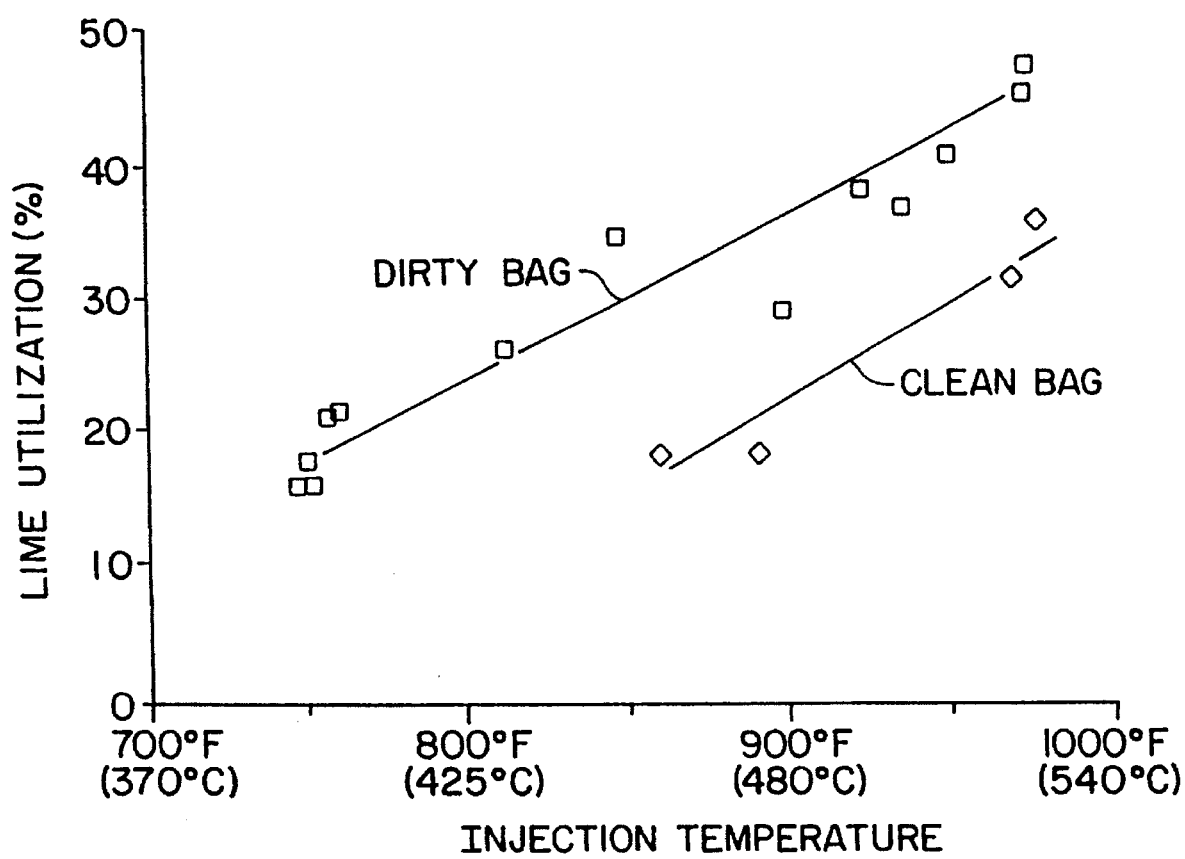
FIG. 5 is a graph of percent lime utilization versus injection temperature.

FIG. 5 shows the influence of bag cleanliness on lime utilization. The $SO_2$ performance always diminished following bag cleaning, probably due to less filter cake on the bags. The baghouse cleaning technique consisted of cleaning one row of bags at a time with the entire cycle lasting about 3 minutes.

An explanation for the apparent synergism between $SO_2$ reaction and thermal decomposition is that upon injection of calcium hydroxide into the flue gas both $SO_2$ reaction and dehydration commence immediately in the following manner:

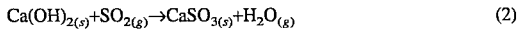
$$Ca(OH)_{2(s)}+SO_{2(g)}\rightarrow CaSO_{3(s)}+H_2O_{(g)} \tag{2}$$

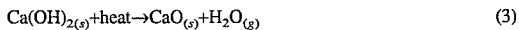
$$Ca(OH)_{2(s)}+heat\rightarrow CaO_{(s)}+H_2O_{(g)} \tag{3}$$

The decomposition product, CaO, may react further with $SO_2$ as follows:

$$CaO_{(s)}+SO_{2(g)}\rightarrow CaSO_{3(s)} \tag{4}$$

In addition, the $CaSO_3$ reaction product may oxidize to $CaSO_4$:

$$CaSO_{3(s)}+\tfrac{1}{2}O_{2(g)}\rightarrow CaSO_{4(s)} \tag{5}$$

Figure 6:
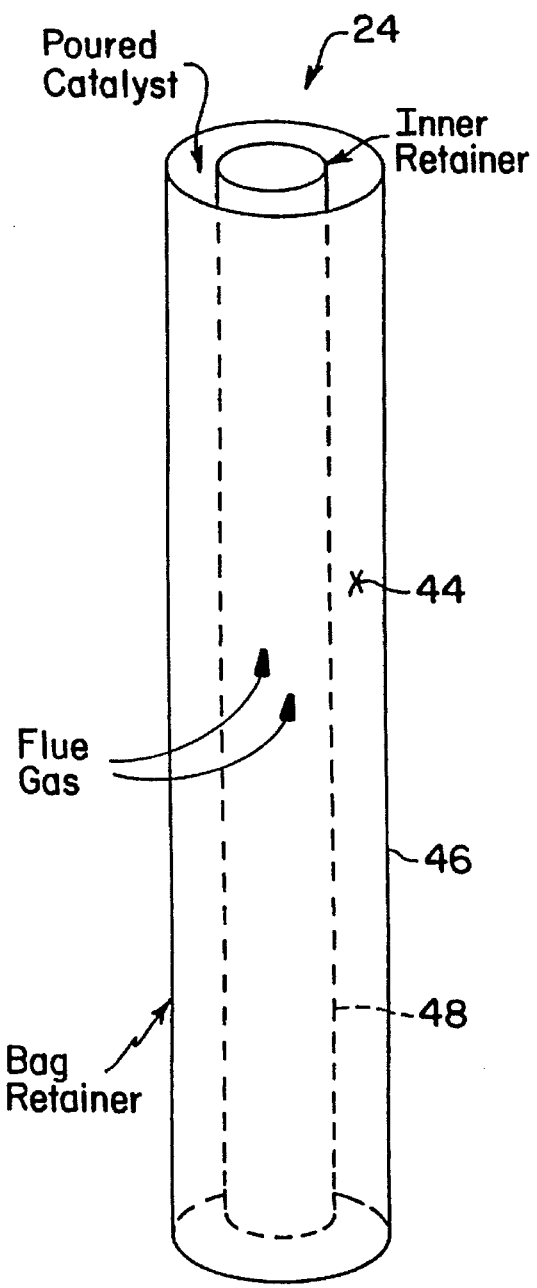
FIG. 6 is an illustration of a configuration of a SCR catalyst employable in the present invention.

FIGS. 6–9 are four configurations of the SCR catalyst designed to be inserted into each bag 26 of a high temperature fabric filter house 16 shown in FIG. 2. These catalysts are used in a baghouse 16 employing "outside" filtration, such as, in a pulsed Jet baghouse. FIG. 6 depicts a catalyst bed formed by two concentric cylinders 46, 48 each being constructed of a porous material such as a perforated metal plate. The width of the gap created between these two cylinders 46, 48 are at least one inch, but probably less than 3 inches. The catalyst is placed in the space between the cylinder 46, 48 preferably by pouring it into place. Any poured catalyst, such as Raschig Rings, may be utilized, but preferably the catalysts are Zeolite.

An alternate embodiment of this configuration is a highly porous, monolithic, thick-walled cylinder catalyst which serves a dual purpose of catalyst and bag retainer.

Figure 7:
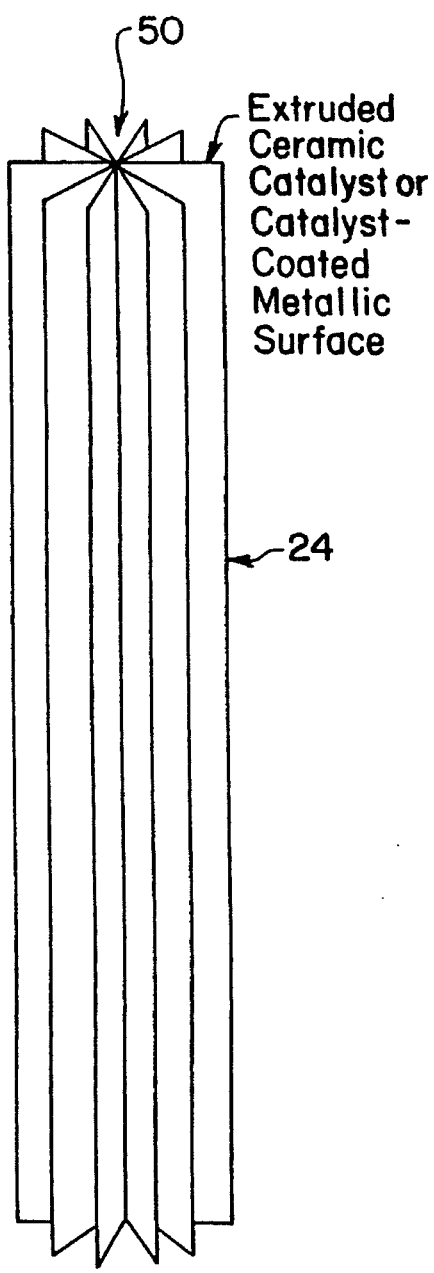
FIG. 7 is an alternate embodiment of a SCR catalyst.

FIG. 7 depicts a parallel plate-type catalyst configured to fit into a conventional bag retainer. The flue gas, upon entering the bag 26, flows up through the wedge-shaped passages 50 coated with the SCR catalyst. Alternate embodiments of this configuration are either as an extruded monolith or metal plates coated with the catalyst.

FIG. 8 depicts a catalyst monolith 52 placed at the top of each bag 26 and through which a bag blow-back tube 54 extends. The shape of the passages through the monolith 52 is arbitrary, but honeycomb is the preferable shape. Alternately, the monolith catalyst 24 may be placed above the tube sheet 58 immediately over each bag exit.

FIG. 9 depicts a configuration in which each bag consists of a doubled wall retainer formed by two concentric cylinders, 46, 48 similar to the configuration shown in FIG. 6. However, in this embodiment, the catalyst is placed inside the second cylinder 48. The gap between cylinders 46, 48 provides an unobstructed passage for blowback gas during the cleaning cycle. A check valve arrangement (not shown) prevents flue gas from entering the blow-back region.

While a specific embodiment of the present invention has been shown and described in detail to illustrate the application and principles of the invention, it will be understood that it is not intended that the present invention be limited thereto and that the invention may be embodied otherwise without departing from such principles.

We claim:

1. A method of controlling emissions of a fossil fuel fired boiler which produces flue gases containing $SO_x$, $NO_x$ and particulate, the flue gases being supplied along a flue gas stream to a stack for discharge, comprising the steps of:

providing a high-temperature pulse jet fabric filter house and heat recovering means between the boiler and the stack in series along the flue gas scream with the fabric filter house being upstream of the heat recovering means and having a plurality of fabric filter bags contained therein with each of the fabric filter bags having a bag retainer situated therein;

positioning a selective catalytic reduction catalyst inside each bag retainer of each of the fabric filter bags in the filter house;

injecting sorbent and an ammoniacal compound into the flue gas stream upstream of the fabric filter house for reacting with $SO_x$ and $NO_x$, the $NO_x$ being further reduced inside the fabric filter house in the presence of the catalyst to clean the hot flue gas; and supplying the clean hot flue gas to the heat recovering means for recovery of the heat therefrom.

2. A method according to claim 1, further comprising the step of recycling the reacted sorbent from the filter house for reinjection into the flue gas stream.

3. A method according to claim 1, wherein the sorbent is a member selected from the group consisting of calcium oxide, calcium lignosulfonate, calcium silicate hydrates, calcium hydroxide, calcium carbonate, calcium bicarbonate, sodium carbonate, sodium bicarbonate, trona, sodium sesquicarbonate, soda ash, nahcolite, sodium aluminate, and metal oxides.

4. A method according to claim 1, wherein the ammoniacal compound is a member selected from the group consisting of urea, ammonium sulfate, cyanuric acid, ammonia, and organic amines.

5. A method as recited in claim 1, wherein said positioning step includes coating the catalyst on wedge-shaped metal plates prior to positioning the catalyst in the filter bag retainer.

6. A method as recited in claim 1, wherein the positioning step includes situating in an upper portion of the fabric filter bag the catalyst further having a plurality of passages defining a honeycomb shape.

7. A method as recited in claim 6, wherein the situating step includes providing a blow-back tube extending through the catalyst for periodically cleaning the fabric filter bag.

8. A method as recited in claim 1, wherein the positioning step includes situating a catalyst bed between two concentric cylinders with each of the cylinders being constructed of a porous material.

9. A method as recited in claim 1, wherein the positioning step includes situating a catalyst bed in a cylinder that is surrounded coaxially by a second cylinder with both of the cylinders being constructed of a porous material.

10. A method according to claim 1, wherein said pulse jet fabric filter house is at a temperature range between 700°–850° F.

* * * * *